United States Patent
Ikeda et al.

(10) Patent No.: US 9,846,424 B2
(45) Date of Patent: Dec. 19, 2017

(54) NUMERICAL CONTROL APPARATUS

(71) Applicants: Ryoichi Ikeda, Tokyo (JP); Nobuyuki Takahashi, Tokyo (JP); Kohei Yamamoto, Tokyo (JP)

(72) Inventors: Ryoichi Ikeda, Tokyo (JP); Nobuyuki Takahashi, Tokyo (JP); Kohei Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 242 days.

(21) Appl. No.: 14/761,711

(22) PCT Filed: Mar. 29, 2013

(86) PCT No.: PCT/JP2013/059706
§ 371 (c)(1),
(2) Date: Jul. 17, 2015

(87) PCT Pub. No.: WO2014/155723
PCT Pub. Date: Oct. 2, 2014

(65) Prior Publication Data
US 2015/0355621 A1 Dec. 10, 2015

(51) Int. Cl.
*G05B 19/18* (2006.01)
*G05B 19/4093* (2006.01)

(52) U.S. Cl.
CPC ......... *G05B 19/18* (2013.01); *G05B 19/4093* (2013.01); *G05B 2219/35216* (2013.01); *Y02P 90/265* (2015.11)

(58) Field of Classification Search
USPC ........................................ 700/159, 180–183
See application file for complete search history.

(56) References Cited

U.S. PATENT DOCUMENTS

| | | | | |
|---|---|---|---|---|
| 5,113,338 A | * | 5/1992 | Seki | G05B 19/40935 700/180 |
| 2003/0033048 A1 | * | 2/2003 | Nakamura | G05B 19/4093 700/182 |
| 2013/0144416 A1 | * | 6/2013 | Rataul | G05B 19/41805 700/95 |

FOREIGN PATENT DOCUMENTS

| JP | 63-149705 A | 6/1988 |
|---|---|---|
| JP | 63-214811 A | 9/1988 |

(Continued)

OTHER PUBLICATIONS

Decision to Grant for JP Application No. 2013-532398 dated Oct. 15, 2013.

(Continued)

*Primary Examiner* — Jason Lin
(74) *Attorney, Agent, or Firm* — Sughrue Mion, PLLC; Richard C. Turner

(57) ABSTRACT

Included are an NC command input unit that receives an NC command serving as an NC command that enables processing independent of NC machining and that is independent of a model of an NC machine tool and an NC command; a machine information storage unit; a tool information storage unit; a command analysis unit that determines whether an NC command input to the NC command input unit is the NC command; a command creation unit that, creates a designated operation program that enables the NC machine tool to perform a series of operations corresponding to the NC command on the basis of the NC command, the model information, and the tool information; and a CNC control unit that controls the NC machine tool.

9 Claims, 12 Drawing Sheets

(56) References Cited

FOREIGN PATENT DOCUMENTS

| JP | 02-036048 A | 2/1990 |
| JP | 02-065946 A | 3/1990 |
| JP | 04-102903 A | 4/1992 |
| JP | 04-164549 A | 6/1992 |
| JP | 07-334219 A | 12/1995 |
| JP | 10-063323 A | 3/1998 |
| JP | 10-312209 A | 11/1998 |
| JP | 2005-149216 A | 6/2005 |
| JP | 2008-59518 A | 3/2008 |
| JP | 2009-053736 A | 3/2009 |

OTHER PUBLICATIONS

International Search Report for PCT/JP2013/059706 dated May 7, 2013.

* cited by examiner

FIG.2

| AXIS NAME | X | Y | Z | B | C |
|---|---|---|---|---|---|
| AXIS TYPE | STRAIGHT LINE AXIS | STRAIGHT LINE AXIS | STRAIGHT LINE AXIS | ROTATION AXIS | ROTATION AXIS |
|  |  |  |  |  |  |

| TOOL REST TYPE | ATC |
|---|---|
|  |  |

FIG.3

| TNo. | TOOL TYPE | TOOL LENGTH | ... |
|---|---|---|---|
| 1 | TURNING TOOL | 130. | ... |
| 2 | MILLING TOOL | 100. | ... |
|  |  |  |  |

FIG.4

| TCHG | X100. Y10. Z100. P1. T10. S1. | ~81 |
|------|-------------------------------|-----|
| FRME | X100. Y10. Z100. B90. C90 I0 J1 K0 R45 G54 P1 | ~82 |
| APRP | X100. Y10. Z100. A0. B90. C90. P1. | ~83 |
| ESCP | X100. Y10. Z100. A0. B90. C90. P1. | ~84 |

FIG.13

| COMMAND BEFORE CHANGE | NAME OF COMMAND AFTER CHANGE | EFFECTIVE COMMAND | |
|---|---|---|---|
| TCHG | G800 | NAME OF COMMAND AFTER CHANGE | |
| | | | |
| | | | |

NUMERICAL CONTROL APPARATUS

CROSS REFERENCE TO RELATED APPLICATIONS

This application is a National Stage of International Application No. PCT/JP2013/059706 filed Mar. 29, 2013, the contents of all of which are incorporated herein by reference in their entirety.

FIELD

The present invention relates to a numerical control apparatus that controls a machine tool in accordance with an NC command.

BACKGROUND

Numerical control apparatuses that perform numerical control (hereinafter referred to as NC in some cases) on a machine tool cause the NC machine tool to operate in accordance with NC commands in an NC program. For example, for an NC machine tool to machine a workpiece into a complex shape by means of such as five-axis machining and die machining, an NC program for machining the workpiece is created. Such an NC program is often created by using Computer Aided Manufacturing (CAM).

CAM refers to a system in which a computer assists in creating commands for a numerical control apparatus. The CAM system creates a tool path on a coordinate system set up for a workpiece. The CAM system then allows its internal post processor to convert the commands to NC commands in order to load the commands (including the tool path, machine-specific command types, and operations corresponding to a machine-specific configuration) into an NC machine tool that is to machine the workpiece.

CAM system manufacturers create a post processor for every type of NC machine tool offered by each NC machine tool manufacturer so that commands that include machine-specific command types (such as M codes) and operations corresponding to machine-specific configuration (such as operations corresponding to an axis configuration) are converted into NC commands corresponding to the NC machine tools offered by each NC machine tool manufacturer. With this procedure, a CAM user in general needs to either purchase a CAM post processor created for the NC machine tool that the user plans to use or to create a post processor for the NC machine tool that the user plans to use.

The NC apparatus disclosed in Patent Literature 1 determines, upon the input of an NC command not dependent on an NC machine tool, whether the NC command can be executed in each of the individual NC machine tools. If the command is determined as being executable, the NC apparatus converts the NC command into each of the machine commands with which the NC machine tool will perform the machining.

CITATION LIST

Patent Literature

Patent Literature 1: Japanese Patent Application Laid-Open No. 2009-53736

SUMMARY

Technical Problem

The conventional technique described above, however, has a problem in that, for a command to travel to a machining start position or for a machine-specific command, a user is required to change an axis travel sequence or add a command to switch main spindle controls.

For example, when the user switches NC machine tools from a dedicated milling machine to a multitasking machine, to execute NC commands for the same machining, the user is required to add a command to switch the main spindle control to execute NC commands. Additionally, a different axis configuration involves a different axis travel sequence when retracting the tool after the machining is finished, which also requires the user to change NC commands.

Many machine-specific operations of an NC machine tool, such as a tool replacing operation, setting up a coordinate system, selecting a main spindle with which to machine, switching between speed control and positioning control of the main spindle, and traveling to a machining start point position or to a machining end point position in such a manner that interference with a workpiece is avoided, are not dependent on the machining process itself. Additionally, as described above, it is necessary to create a post processor for each model of NC machine tools so that commands that include machine-specific command types or operations are converted into NC commands corresponding to the NC machine tool being used. Hence, there is a need to allow for the use of a common machine-specific command type or operation for NC machine tools so as to reduce the workload for developing post processors.

The present invention has been made in view of the above, and an objective of the present invention is to provide a numerical control apparatus in which common operation commands not dependent on machining itself can be used in common for each NC machine tools.

Solution to Problem

In order to solve the problem and achieve the objective mentioned above, the present invention relates to a numerical control apparatus that includes: an NC command input unit that receives a first NC command and a second NC command, the first NC command being independent of a model of an NC machine tool and serving as an NC command that enables processing independent of NC machining to be performed, and the second NC command enabling the NC machining to be performed; a machine information storage unit that stores therein model information related to the model of the NC machine tool; a tool information storage unit that stores tool information on a tool to be used on the NC machine tool; a command analysis unit that determines whether an NC command input to the NC command input unit is the first NC command; a command creation unit that, when the NC command is the first NC command, creates a designated operation program on the basis of the first NC command, the model information, and the tool information, the designated operation program enabling the NC machine tool to perform a series of operations corresponding to the first NC command; and a control unit that controls the NC machine tool by executing the designated operation program.

Advantageous Effects of Invention

In the present invention, when an NC command is an operation command not dependent on machining itself, a designated operation program that enables an NC machine tool to perform a series of operations is created on the basis of the model information and the tool information of the NC machine tool, thus, allowing a common operation command not dependent on machining to be used for each of the NC machine tools.

BRIEF DESCRIPTION OF DRAWINGS

FIG. 2 is a diagram illustrating an example of machine information.

FIG. 3 is a diagram illustrating an example of tool information.

FIG. 4 is a diagram illustrating an example of NC commands independent of the axis configuration of an NC machine tool and the presence and type of a peripheral device.

FIG. 13 is a diagram illustrating correspondence information indicative of correspondence of a command format.

DESCRIPTION OF EMBODIMENTS

Exemplary embodiments of a numerical control apparatus according to the present invention will now be described in detail with reference to the drawings. Note that the present invention is not limited to the embodiments.

First Embodiment

Figure 1:
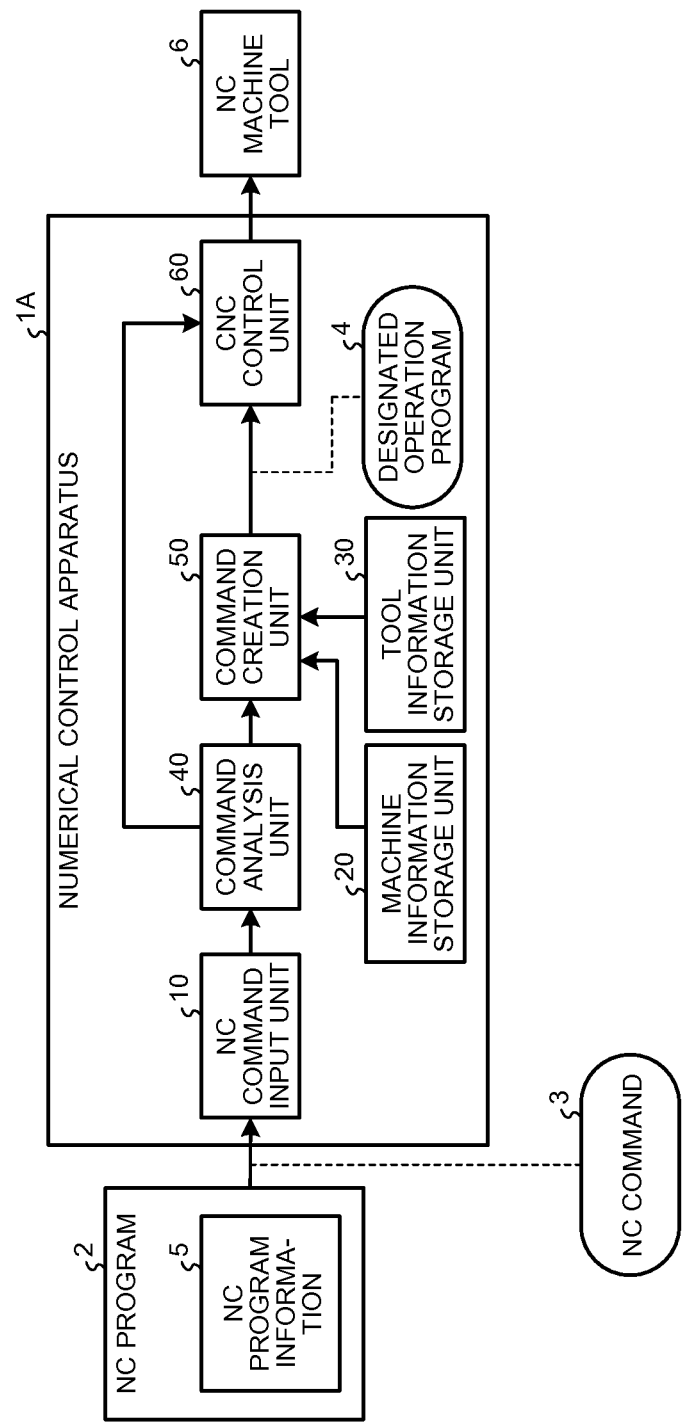
FIG. 1 is a block diagram illustrating the configuration of a numerical control apparatus according to a first embodiment.

FIG. 1 is a block diagram illustrating the configuration of a numerical control apparatus according to a first embodiment. A numerical control apparatus 1A is an apparatus that controls an NC machine tool 6 by using an NC program. In the present embodiment, a common command (an NC command 3) is defined in advance for performing processing that is not dependent on the NC machine tool 6. Then, the NC command 3, which is not dependent on the NC machine tool 6, is generated and is input to the numerical control apparatus 1A. The numerical control apparatus 1A generates a common command (a designated operation program 4 to be described in the following) that enables a series of operations to be performed. This common command is generated on the basis of the NC command 3, which is not dependent on the NC machine tool 6, and it controls the NC machine tool 6 in accordance with the designated operation program 4.

Processing independent of the NC machine tool 6 is, for example, a processing independent of machining (an operation unrelated to the type and the like of machining) and includes, for example, tool replacing, setting up a coordinate system, and traveling to a start point position or traveling to an end point position. The numerical control apparatus 1A generates a common command for enabling the NC machine tool 6 to perform, as an operation independent of the machining, an operation related to machining preparation, for example.

The numerical control apparatus 1A includes an NC command input unit 10, a machine information storage unit 20, a tool information storage unit 30, a command analysis unit 40, a command creation unit 50, and a CNC control unit 60. On the input of the NC command 3 which is in an NC program 2, the NC command input unit 10 transmits the NC command 3 to the command analysis unit 40. On the input of NC program information 5 which is in the NC program 2, the NC command input unit 10 also transmits the NC program information 5 to the command analysis unit 40. The NC command input unit 10 according to the present embodiment receives, for example, a first NC command (the NC command 3), which is independent of the model of the NC machine tool 6 and serves as an NC command that enables processing independent of NC machining to be performed, and a second NC command, which enables the NC machining to be performed.

The NC program 2 is a program used to control the NC machine tool 6 and is created with, for example, CAM. The NC program 2 includes the NC program information 5, the NC command 3, which is an operation command independent of the machining, and an NC command (not shown) that is an operation command dependent on the machining. The NC program information 5 includes material information on a workpiece (the material to be machined).

The NC command 3 is a general-purpose NC command, independent of the model of the NC machine tool 6. In the present embodiment, the types of processing independent of the NC machine tool 6 are associated in advance with the types of the NC command 3 (processing according to commands) so that the CAM system generates the NC command 3 according to the association.

The model of an NC machine tool is determined by at least one of the axis configuration of the NC machine tool, the presence of a peripheral device for the NC machine tool, and the type of peripheral device. As the NC command 3 according to the present embodiment, an operation command, which is independent of the NC machine tool 6 and is common to each NC machine tool 6, is used for each NC machine tool 6. The NC machine tool 6 is, for example, a machine that performs a milling operation, a machine that performs a turning operation, or the like.

The machine information storage unit 20 is a memory that stores machine information 91 related to the NC machine tool 6 therein and the like. The machine information storage unit 20 according to the present embodiment stores, as the machine information 91, model information related to the model of the NC machine tool 6, for example.

FIG. 2 is a diagram illustrating an example of machine information. The machine information 91 includes information related to the model of the NC machine tool 6 (such as a second main spindle model and a multitasking model) and includes, for example, the axis configuration of the NC machine tool 6 and information on a peripheral device provided to the NC machine tool 6. Specifically, the machine information 91 includes, as information related to the model of the NC machine tool, at least one of the axis configurations of the NC machine tool, the presence of a peripheral device for the NC machine tool, and the type of peripheral device. The machine information 91 may also include specification information related to axes such as the names of the axes and the types of axis, and other specification information such as the type of tool rest (the type of peripheral device).

The tool information storage unit 30 stores tool information 92 related to a tool to be mounted on the NC machine tool 6 and may be a memory. The tool information storage unit 30 according to the present embodiment stores, as the tool information 92, information on a tool to be used by the NC machine tool 6.

FIG. 3 is a diagram illustrating an example of tool information. The tool information 92 includes the information on tools to be used by the NC machine tool 6 and on a peripheral device, such as a tool number (TNo.), a tool type, and a tool length.

The command analysis unit 40 determines whether an NC command transmitted from the NC command input unit 10 is the NC command 3, which is independent of the machining. Specifically, the command analysis unit 40 determines whether the NC command transmitted from the NC command input unit 10 is the NC command 3, which is independent of the machining, on the basis of whether the NC command is identical to the NC command 3 set in advance.

If the NC command transmitted from the NC command input unit 10 is the NC command 3, which is independent of the machining, the command analysis unit 40 determines that a command operation independent of the machining be performed. The command analysis unit 40 creates argument data from arguments (setting arguments) that designate the operation. The command analysis unit 40 transmits the created argument data to the command creation unit 50. When the NC program information 5 is transmitted from the NC command input unit 10, the command analysis unit 40 transmits the NC program information 5 to the command creation unit 50.

The command creation unit 50 reads the machine information 91 from the machine information storage unit 20 and the tool information 92 from the tool information storage unit 30. The command creation unit 50 creates the designated operation program 4, which enables a series of operations corresponding to the NC command 3 to be performed on the basis of the argument data, the machine information 91, and the tool information 92. The designated operation program 4 is an NC program created, for example, in an EIA format. The designated operation program 4 created by the command creation unit 50 is independent of the model of the NC machine tool. The command creation unit 50 transmits the created designated operation program 4 to the CNC control unit 60.

The CNC control unit 60 controls the NC machine tool 6 by executing the designated operation program 4. The CNC control unit 60 has functions that an ordinary NC apparatus has, such as a decoding unit that decodes the designated operation program 4, a distribution unit that distributes a travel command to each axis, and a servo control unit.

FIG. 4 is a diagram illustrating an example of NC commands that are independent of the axis configuration of the NC machine tool and the presence and type of a peripheral device. In FIG. 4, the format and the type of the NC command 3 are indicated. The types of the NC command 3 include tool replacing (TCHG), coordinate system setting (FRME), traveling to a machining start point position (APRP), and traveling to a machining end point position (ESCP).

Arguments are designated in the NC command 3 to designate respective detailed operations. TCHG, FRME, APRP, and ESCP define the respective types of processing (tool replacing, coordinate system setting, traveling to a start point position, and traveling to an end point position). The numerical control apparatus 1A generates the designated operation program 4 from the NC command 3 according to this prescription. The travel command to a machining start point position is a command to move a tool from an initial position to a turning start position. The travel to a machining end point position is a command to move the tool from a turning end position to the initial position.

In the examples in FIG. 4, arguments 81 designate a detailed operation for TCHG, and arguments 82 designate a detailed operation for FRME. Additionally, arguments 83 designate a detailed operation for APRP, and arguments 84 designate a detailed operation for ESCP. The arguments 81 to 84 are designated, for example, as described below.

The arguments 81 are designated as X100.Y10.Z100.P1.T10.S1.

The arguments 82 are designated as X100.Y10.Z100.B90.C90.I0 J1 K0 R45 G54 P1.

The arguments 83 are designated as X100.Y10.Z100.A0.B90.C90.P1.

The arguments 84 are designated as X100.Y10.Z100.A0.B90.C90.P1.

Figure 5:
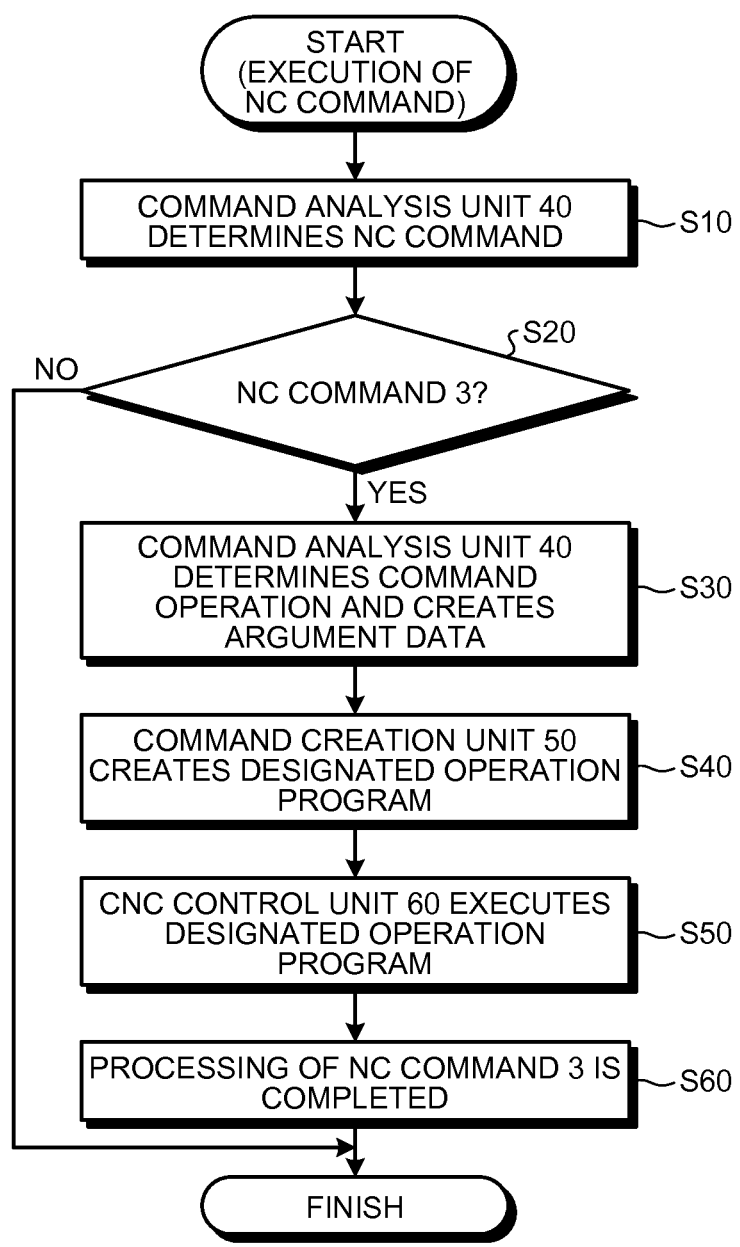
FIG. 5 is a flowchart illustrating a processing procedure for executing an NC command.

A processing procedure of the numerical control apparatus according to the first embodiment will now be described in brief. FIG. 5 is a flowchart illustrating a processing procedure for executing an NC command. When an NC command in the NC program 2 is input to the NC command input unit 10, the NC command is transmitted to the command analysis unit 40. When the NC program information 5 in the NC program 2 is input to the NC command input unit 10, the NC program information 5 is also transmitted to the command analysis unit 40. Upon receiving the NC command, the command analysis unit 40 determines whether the NC command is the NC command 3, which is independent of the machining (step S10).

If the NC command is the NC command 3, which is independent of the machining (Yes at step S20), the command analysis unit 40 determines that the NC machine tool 6 execute a command operation independent of the machining. The command analysis unit 40 creates argument data from the arguments designated in the NC command 3 (step S30). The command analysis unit 40 transmits the created argument data to the command creation unit 50.

The command creation unit 50 reads the machine information 91 from the machine information storage unit 20 and the tool information 92 from the tool information storage unit 30. The command creation unit 50 creates the designated operation program 4 that enables a series of operations corresponding to the NC command 3. The command creation unit 50 is created on the basis of the argument data, the machine information 91, and the tool information 92 (step S40). The command creation unit 50 transmits the created designated operation program 4 to the CNC control unit 60. The CNC control unit 60 executes the designated operation program 4 (step S50). When the CNC control unit 60 has executed the designated operation program 4 (after the completion of the execution), the processing of the NC command 3, which is independent of the machining, is completed (step S60).

If the NC command is not the NC command 3 (No at step S20), the command analysis unit 40 transmits the NC command as an ordinary NC command to the CNC control unit 60. The CNC control unit 60 performs ordinary numerical control if the NC command is an ordinary NC command or if a designated operation program is in a G-code format.

(Processing for Identifying the NC Command 3)

Figure 6:
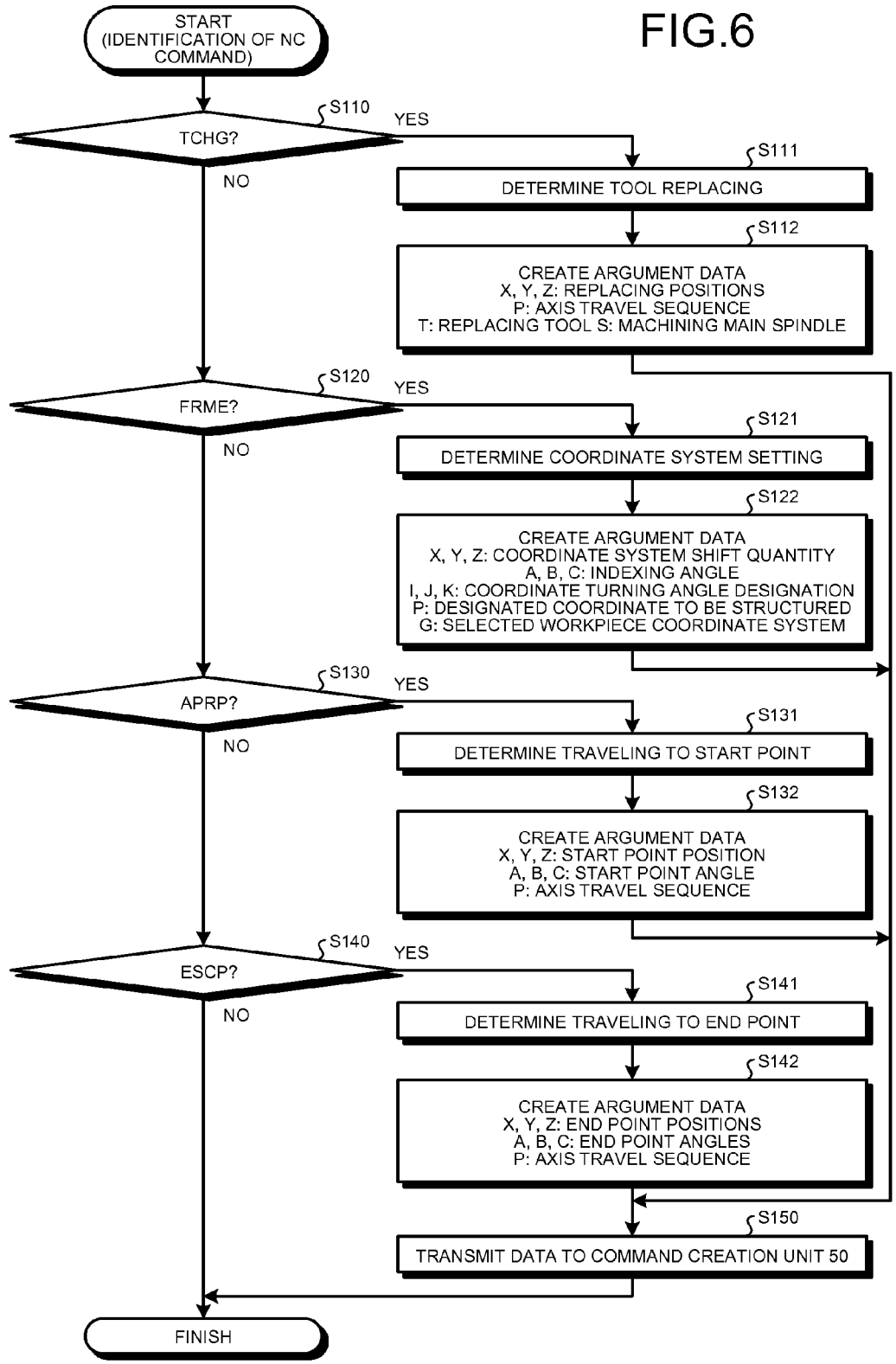
FIG. 6 is a flowchart illustrating a processing procedure for identifying an NC command independent of machining.

The processing performed by the command analysis unit 40 to identify the NC command 3 will now be described. FIG. 6 is a flowchart illustrating a processing procedure for identifying an NC command that is independent of the machining. The command analysis unit 40 determines the operation of the NC command 3, which is independent of the machining, and the meaning of the arguments designated in the NC command 3. In other words, the command analysis unit 40 determines the type of processing designated by the NC command 3.

Specifically, the command analysis unit 40 determines whether the NC command 3 is TCHG (step S110). If the NC command 3 is TCHG (Yes at step S110), the command analysis unit 40 determines that the NC command 3 is a command for a tool replacing operation (step S111).

Then, the command analysis unit 40 reads the arguments from the NC command 3 and creates argument data for the tool replacing operation on the basis of the arguments. In the case of the tool replacing, the command analysis unit 40 handles arguments X, Y, and Z as the positions of the axes to perform the tool replacing command (replacing positions). The command analysis unit 40 handles an argument P as the sequence to move the axes (axis travel sequence). The command analysis unit 40 also handles an argument T as the tool that is to replace (replacing tool) and an argument S as the main spindle (machining main spindle) for machining with the replacing tool (step S112). The machining main spindle is, for example, a first main spindle or a second main spindle. The command analysis unit 40 transmits the created argument data to the command creation unit 50 to finish the processing for identifying the NC command 3 (step S150).

If the NC command 3 is not TCHG (No at step S110), the command analysis unit 40 determines whether the NC command 3 is FRME (step S120). If the NC command 3 is FRME (Yes at step S120), the command analysis unit 40 determines that the NC command 3 is a command for setting up a coordinate system (step S121).

Then, the command analysis unit 40 reads the arguments from the NC command 3 and creates argument data for setting up a coordinate system on the basis of the arguments. In the case of setting up a coordinate system, the command analysis unit 40 handles the arguments X, Y, and Z as coordinate system shift quantities. The command analysis unit 40 also handles arguments A, B, and C as indexing angles. The command analysis unit 40 also handles arguments I, J, and K as coordinate turning angle designations. The command analysis unit 40 also handles the argument P as a designation for the coordinates to be structured and an argument G as the workpiece coordinate system to be selected (step S122). The command analysis unit 40 transmits the created argument data to the command creation unit 50 in order to finish the processing for identifying the NC command 3 (step S150). When a coordinate system shift quantity, a rotation center axis, and a coordinate conversion type are designated in the NC command 3, and the command analysis unit 40 transmits such designating information to the command creation unit 50.

If the NC command 3 is not FRME (No at step S120), the command analysis unit 40 determines whether the NC command 3 is APRP (step S130). If the NC command 3 is APRP (Yes at step S130), the command analysis unit 40 determines that the NC command 3 is a travel command to a machining start point position (step S131).

Then, the command analysis unit 40 reads the arguments from the NC command 3 and creates argument data for traveling to the start point position on the basis of the arguments. In the case of traveling to a start point position, the command analysis unit 40 handles the arguments X, Y, and Z as the start point positions (machining starting coordinates). The command analysis unit 40 also handles the arguments A, B, and C as start point angles. The command analysis unit 40 also handles the argument P as the axis travel sequence. The command analysis unit 40 also handles the argument T as a tool correction type and an argument H as a tool correction number (step S132). The command analysis unit 40 transmits the created argument data to the command creation unit 50 to finish the processing for identify the NC command 3 (step S150).

If the NC command 3 is not APRP (No at step S130), the command analysis unit 40 determines whether the NC command 3 is ESCP (step S140). If the NC command 3 is ESCP (Yes at step S140), the command analysis unit 40 determines that the NC command 3 is a travel command to a machining end point position (step S141).

Then, the command analysis unit 40 reads the arguments from the NC command 3 and creates argument data for traveling to the end point position on the basis of the arguments. In the case of traveling to an end point position, the command analysis unit 40 handles the arguments X, Y, and Z as end point positions on the workpiece coordinate system (machining finishing coordinates). The command analysis unit 40 also handles the arguments A, B, and C as the indexing angles. The command analysis unit 40 also handles the argument P as the axis travel sequence (step S142). The command analysis unit 40 transmits the created argument data to the command creation unit 50 to finish the processing for identifying the NC command 3 (step S150).

Note that argument data for each NC command 3 is not limited to the examples illustrated in FIG. 2. For example, when the NC command 3 is FRME, the command analysis unit 40 may designate, with arguments, the creation of a command necessary for an operation (clamping, unclamping, braking, or the like) to be performed after rotation axis indexing. Additionally, the command analysis unit 40 may acquire information from the machine information storage unit 20 after the rotation axis indexing and create a command necessary for a predetermined operation (clamping, unclamping, braking, or the like).

The command creation unit 50 creates the designated operation program 4 on the basis of the argument data received from the command analysis unit 40. If it is determined that the NC command 3 is not a relevant command, the NC command 3 is processed as an ordinary NC command. That is, if the NC command is not any of TCHG, FRME, APRP, or ESCP, the command creation unit 50 does not execute processing or does not create the designated operation program 4. Note that the procedure to identify the type of processing designated in the NC command 3 is not limited to the procedure illustrated in FIG. 6 and may identify TCHG, FRME, APRP, and ESCP in any order.

(Designated Operation Program for Tool Replacing Operation)

Figure 7:
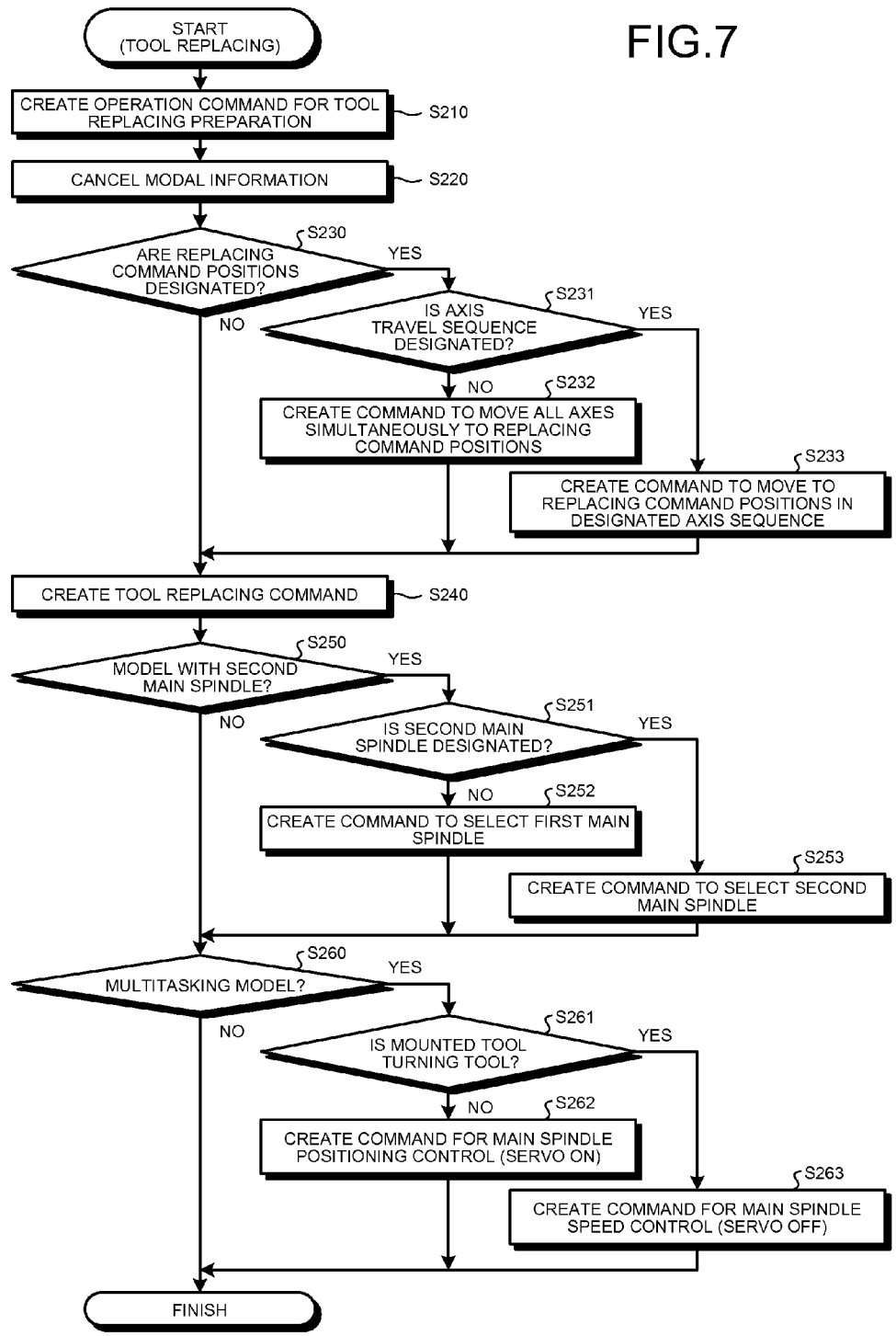
FIG. 7 is a flowchart illustrating a procedure for creating a designated operation program for a tool replacing operation.

FIG. 7 is a flowchart illustrating a procedure to create a designated operation program for the tool replacing operation. The command creation unit 50 creates an operation command for tool replacing preparation (step S210). Specifically, the command creation unit 50 creates a command to turn off the coolant. The command creation unit 50 also verifies the type of tool rest on the basis of the machine information 91. If the type of tool rest is ATC, the command creation unit 50 creates a command to open the shutter. In the manner described above, the command creation unit 50 creates M-code commands necessary for replacing a tool.

The command creation unit 50 creates a command to cancel modal information set for the machining (step S220). Specifically, the command creation unit 50 creates a command to cancel the modal information with which a tool replacing command T code cannot be executed.

The command creation unit 50 verifies whether replacing positions are designated with arguments. If replacing positions are designated (Yes at step S230), the command creation unit 50 verifies whether an axis travel sequence is designated with an argument (step S231). If an axis travel sequence is not designated (No at step S231), the command creation unit 50 creates a command to move all axes simultaneously to the replacing command positions (step S232). On the other hand, if an axis travel sequence is designated (Yes at step S231), the command creation unit 50 creates a command to travel to the replacing command positions in the designated axis travel sequence (step S233). Then, the command creation unit 50 creates a tool replacing command (step S240).

If replacing command positions are designated (No at step S230), the command creation unit 50 creates a tool replacing command (step S240). When a tool replacing command has been created, the command creation unit 50 reads the machine information 91 from the machine information storage unit 20. The command creation unit 50 determines whether the NC machine tool 6 is of a model with a second main spindle on the basis of an argument and the machine information 91 (step S250).

If it is determined that the NC machine tool 6 is of the model with a second main spindle (Yes at step S250), the command creation unit 50 determines whether a second main spindle is designated with an argument in the NC command 3 (step S251).

If a second main spindle is not designated in the NC command 3 (No at step S251), the command creation unit 50 creates an operation command to select a first main spindle (step S252). On the other hand, if a second main spindle is designated in the NC command 3 (Yes at step S251), the command creation unit 50 creates a machine-specific operation command to select the second main spindle (step S253).

If the NC machine tool 6 is not of a model with a second main spindle, the command creation unit 50 determines whether the NC machine tool 6 is of a multitasking model on the basis of an argument and the machine information 91 (step S260). If the NC machine tool 6 is of a multitasking model (Yes at step S260), the command creation unit 50 reads the tool information 92 on the mounted tool from the tool information storage unit 30. Then, the command creation unit 50 determines whether the mounted tool is a turning tool on the basis of the replacing tool designated with an argument and the tool information 92 (step S261).

If the mounted tool is not a turning tool (No at step S261), the command creation unit 50 creates an operation command for the main spindle positioning control (servo on) designated (step S262). On the other hand, if the mounted tool is a turning tool (Yes at step S261), the command creation unit 50 creates an operation command for the main spindle speed control (servo off) designated (step S263).

When a machine-specific command with the main spindle positioning control or the main spindle speed control has been created, the processing for creating the designated operation program 4 for the tool replacing operation is finished. If the NC machine tool 6 is not of a multitasking model, the processing for creating the designated operation program 4 for the tool replacing operation is finished. The command creation unit 50 transmits, as the designated operation program 4 for the tool replacing operation, the commands created during the processing from steps S210 to S263 to the CNC control unit 60.

(Designated Operation Program for Coordinate System Setting)

Figure 8:
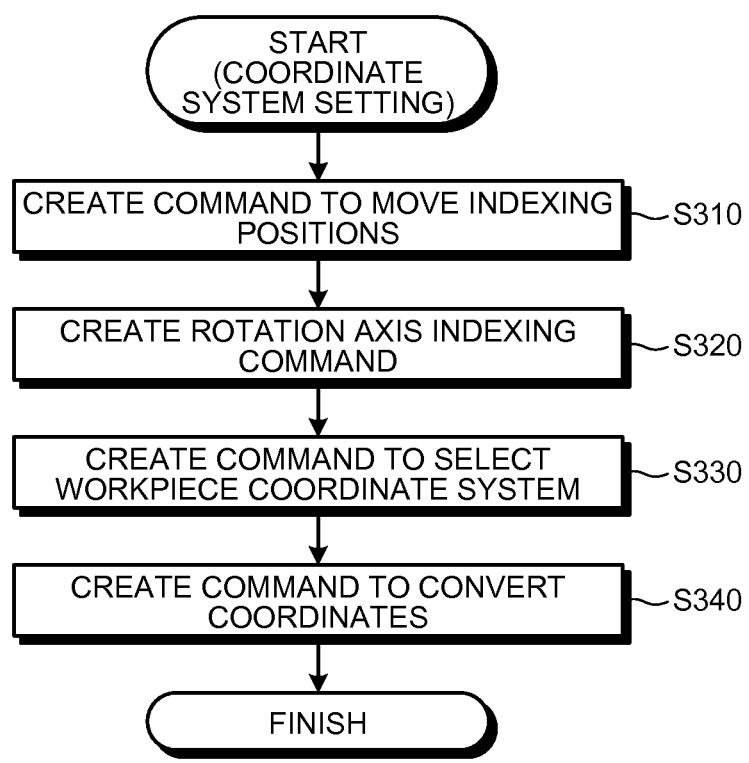
FIG. 8 is a flowchart illustrating a procedure for creating the designated operation program for setting up a coordinate system.

FIG. 8 is a flowchart illustrating a procedure for creating the designated operation program for coordinate system setting. The command creation unit 50 creates a command to move the basic three axes to the machine positions at which the coordinate system setting up is to be performed (a command to move indexing positions) (step S310). At this point, the command creation unit 50 uses values set in the machine information storage unit 20 as the machine positions at which the coordinate system setting is to be performed.

The command creation unit 50 creates a rotation axis indexing command (step S320). If no rotation axis is present in the axis configuration registered in the machine information storage unit 20, the command creation unit 50 does not create a rotation axis indexing command.

The command creation unit 50 creates a command to select a workpiece coordinate system on the basis of information on a selected workpiece coordinate system acquired from the command analysis unit 40 (step S330). If no selected workpiece coordinate system is designated, the command creation unit 50 does not create a command to select a workpiece coordinate system.

The command creation unit 50 derives a coordinate system shift quantity, a rotation center axis, and a coordinate conversion type on the basis of arguments acquired from the command analysis unit 40. Then, the command creation unit 50 creates a command to convert coordinates from the workpiece coordinate system on the basis of the coordinate system shift quantity, the rotation center axis, and the coordinate conversion type (step S340). If no coordinate system shift quantity, rotation center axis, coordinate conversion type, or the like is designated, the command creation unit 50 does not create a command to convert coordinates.

There are models for which an alarm is generated if an NC command is performed in the case where rotation axis indexing or a structure coordinate is designated during the coordinate system setting. Hence, the command creation unit 50 does not have to create an NC command for setting up a coordinate if no rotation axis is present in the machine information 91 acquired from the machine information storage unit 20. The command creation unit 50 transmits, as the designated operation program 4 for setting up a coordinate system, the commands created during the processing at step S S310 to S340 to the CNC control unit 60.

(Designated Operation Program that Commands Traveling to Machining Start Point Position)

Figure 9:
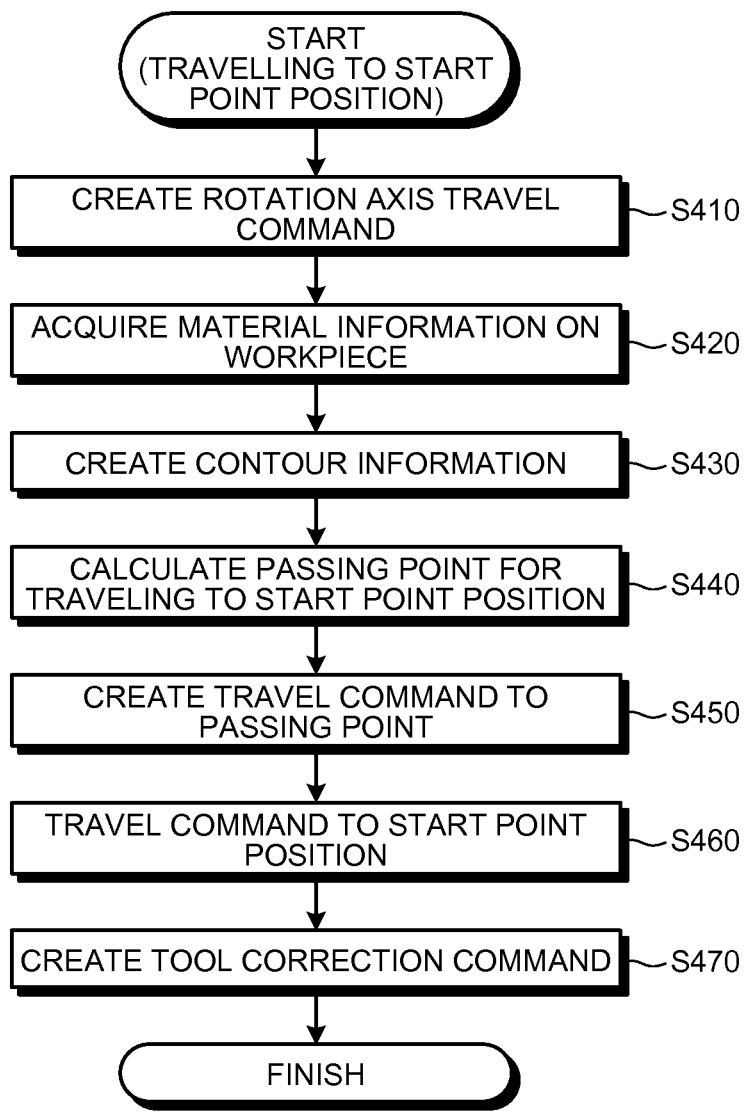
FIG. 9 is a flowchart illustrating a procedure for creating a designated operation program for traveling to a start point position.

FIG. 9 is a flowchart illustrating a procedure for creating the designated operation program for traveling to a start point position. The command creation unit 50 creates a rotation axis travel command (step S410). Specifically, the command creation unit 50 creates a travel command to a start point angle (rotation axis indexing angle) acquired from the command analysis unit 40. If no rotation axis is present in the machine information 91 registered in the machine information storage unit 20, the command creation unit 50 does not create a rotation axis travel command.

The command creation unit 50 acquires material information on a workpiece from the NC program information 5 (step S420). The command creation unit 50 creates contour information from the acquired material information (step S430).

The command creation unit 50 calculates a passing point on the basis of the contour information such that a tool travels outside the contour (outside the material) to a machining start point position. In other words, a passing point for traveling to the start point position is calculated (step S440).

The command creation unit 50 creates a travel command to the passing point calculated at step S440 according to the designation of an axis travel sequence acquired from the command analysis unit 40 (step S450). Then, the command creation unit 50 creates a travel command to the start point position acquired from the command analysis unit 40 (step S460). The command creation unit 50 creates a tool correction command according to a tool correction type and a tool correction number acquired from the command analysis unit 40 (step S470). The command creation unit 50 transmits, as the designated operation program 4 that commands the traveling to the start point position, the commands created during the processing at step S S410 to S470 to the CNC control unit 60.

(Designated Operation Program that Commands Traveling to Machining End Point Position)

Figure 10:
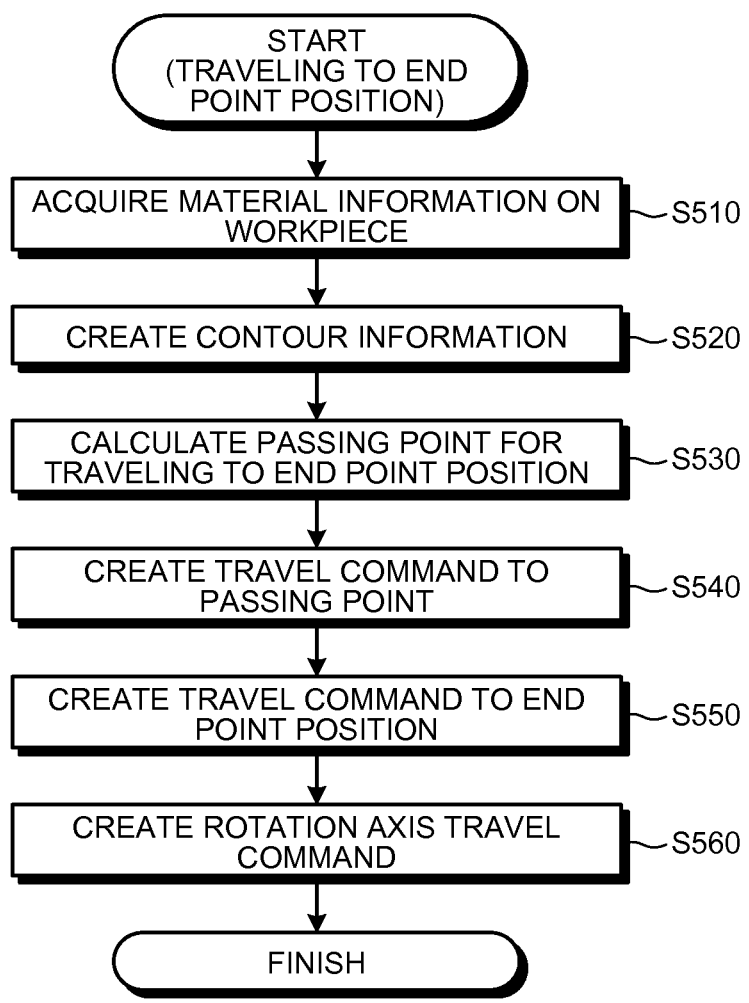
FIG. 10 is a flowchart illustrating a procedure for creating the designated operation program for traveling to an end point position.

FIG. 10 is a flowchart illustrating a procedure to create the designated operation program for traveling to an end point position. The command creation unit 50 acquires material information on a workpiece from the NC program information 5 (step S510). The command creation unit 50 creates contour information from the acquired material information (step S520).

The command creation unit 50 calculates a passing point on the basis of the contour information such that a tool travels outside the contour (outside the material) to a machining end point position. In other words, a passing point for traveling to the end point position is calculated (step S530).

The command creation unit 50 creates a travel command to the passing point calculated at step S530 according to the designation of an axis travel sequence acquired from the command analysis unit 40 (step S540). Then, the command creation unit 50 creates a travel command to the end point position acquired from the command analysis unit 40 (step S550).

The command creation unit 50 creates a rotation axis travel command (step S560). Specifically, the command creation unit 50 creates a travel command to an end point angle (rotation axis indexing angle) acquired from the command analysis unit 40. The command creation unit 50 transmits, as the designated operation program 4 that commands the traveling to the end point position, the commands created during the processing at step S510 to S560 to the CNC control unit 60.

The designated operation program 4 created by the command creation unit 50 is executed immediately by the CNC control unit 60. When all the commands in the designated operation program 4 have been executed, the processing by the NC command 3 is finished, and an NC command subsequent to the designated operation program 4 is executed. The designated operation program 4 is erased immediately once it has been executed.

Note that, while the NC command 3 is input to the numerical control apparatus 1A in the present embodiment, an NC program including the NC command 3 may be input to the numerical control apparatus 1A. In this case, the NC command 3 in the NC program is input to the NC command input unit 10.

In the manner described above, the NC command 3, which is independent of the NC machine tool 6, is defined in advance in the first embodiment. The CAM system creates the NC command 3 according to the definition, and the numerical control apparatus 1A generates the designated operation program 4 to be used for the control of the NC machine tool 6 from the NC command 3 according to the definition. In this way, the numerical control apparatus 1A allows the designated operation program 4, which is generated from the NC command 3 and is common to each NC machine tool 6, to be used for each NC machine tool 6. Additionally, a post processor is allowed to output a machine-specific command type and a machine-specific operation for each NC machine tool 6 to the numerical control apparatus 1A as commands that are common to each NC machine tool 6. Thus, the number of labor-hours necessary for the post processor development can be reduced, which thereby facilitates the post processor development.

Additionally, in the case of an identical axis configuration, an identical NC program can be used independently of the vertical type and horizontal type, which can thereby reduce effort required to change an NC command.

Second Embodiment

A second embodiment of the present invention will now be described with reference to FIG. 11. In the second embodiment, a designated operation program 4 is changed according to an instruction from a user, and an NC program after being changed is output externally.

Figure 11:
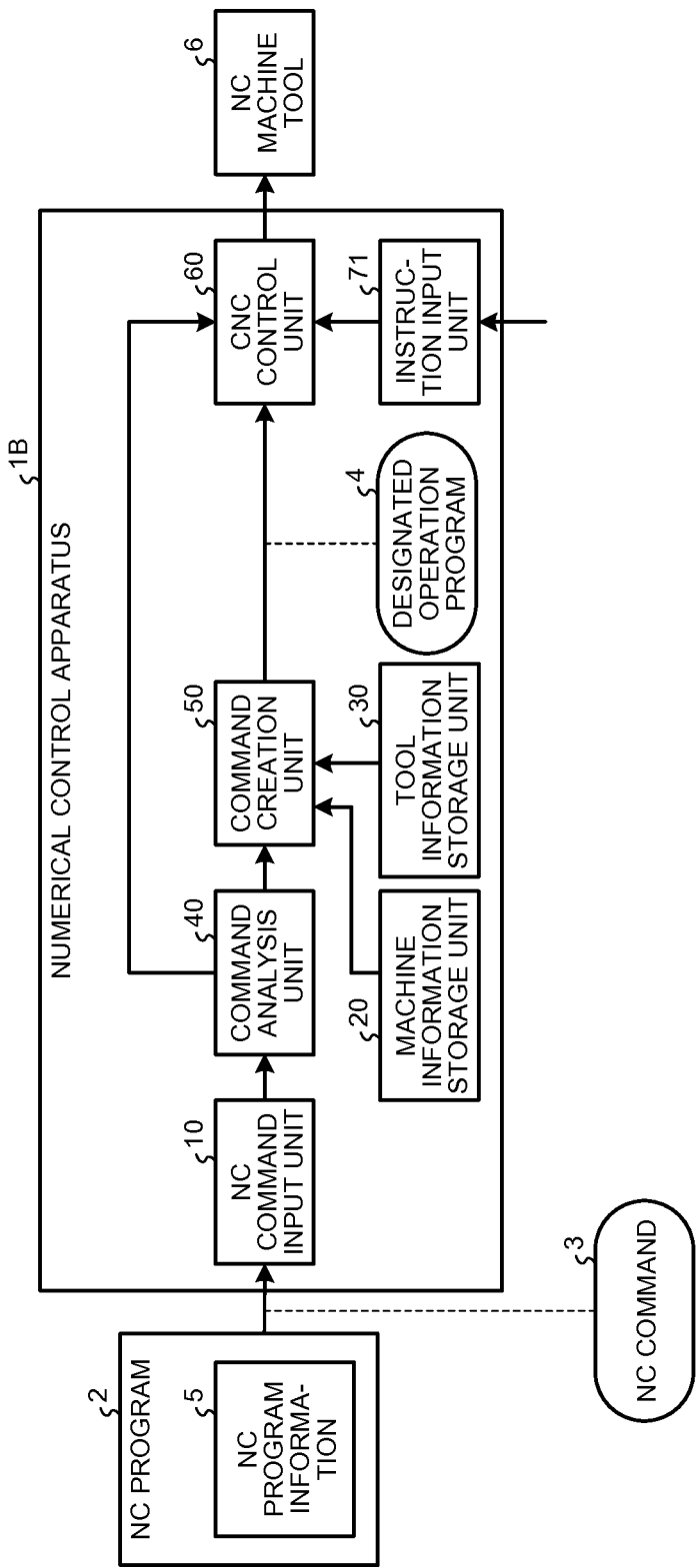
FIG. 11 is a block diagram illustrating the configuration of a numerical control apparatus according to a second embodiment.

FIG. 11 is a block diagram illustrating the configuration of a numerical control apparatus according to the second embodiment. Components in FIG. 11 that achieve identical functions with those of the numerical control apparatus 1A according to the first embodiment illustrated in FIG. 1 are designated with identical reference signs, and duplicate description will be omitted.

A numerical control apparatus 1B according to the second embodiment includes an instruction input unit 71 in addition to the components of the numerical control apparatus 1A. The instruction input unit 71 receives an instruction input by a user (user instruction) and transmits the user instruction to a CNC control unit 60.

The user instruction input to the instruction input unit 71 is an instruction such as to change the operation of an NC machine tool 6. Such instructions include, for example, an instruction to add/change a parameter that prescribes an operation, an instruction to change an argument of an operation command, and an instruction whether to execute an operation or not.

The numerical control apparatus 1B transmits a designated operation program 4 generated by a command creation unit 50 to the CNC control unit 60. The CNC control unit 60 waits for a user instruction to be input from the instruction input unit 71 without executing the designated operation program 4.

The user instruction input to the instruction input unit 71 is transmitted to the CNC control unit 60. In this manner, the CNC control unit 60 changes the designated operation program 4 according to the user instruction. The CNC control unit 60 externally outputs the designated operation program 4 that has been changed according to the user instruction. Note that the CNC control unit 60 may perform control of the NC machine tool 6 with the designated operation program 4 that has been changed according to the user instruction.

In this manner, the second embodiment allows the designated operation program 4 to be changed according to a user instruction input to the instruction input unit 71 and thus provides the capability to enable the NC machine tool 6 to execute an operation desired by a user.

Third Embodiment

A third embodiment of the present invention will now be described with reference to FIG. 12. In the third embodiment, argument data for a designated operation program 4 is replaced with a macro program created in advance. Additionally, argument data for an NC command 3 is interpreted by using a macro program created in advance.

Figure 12:
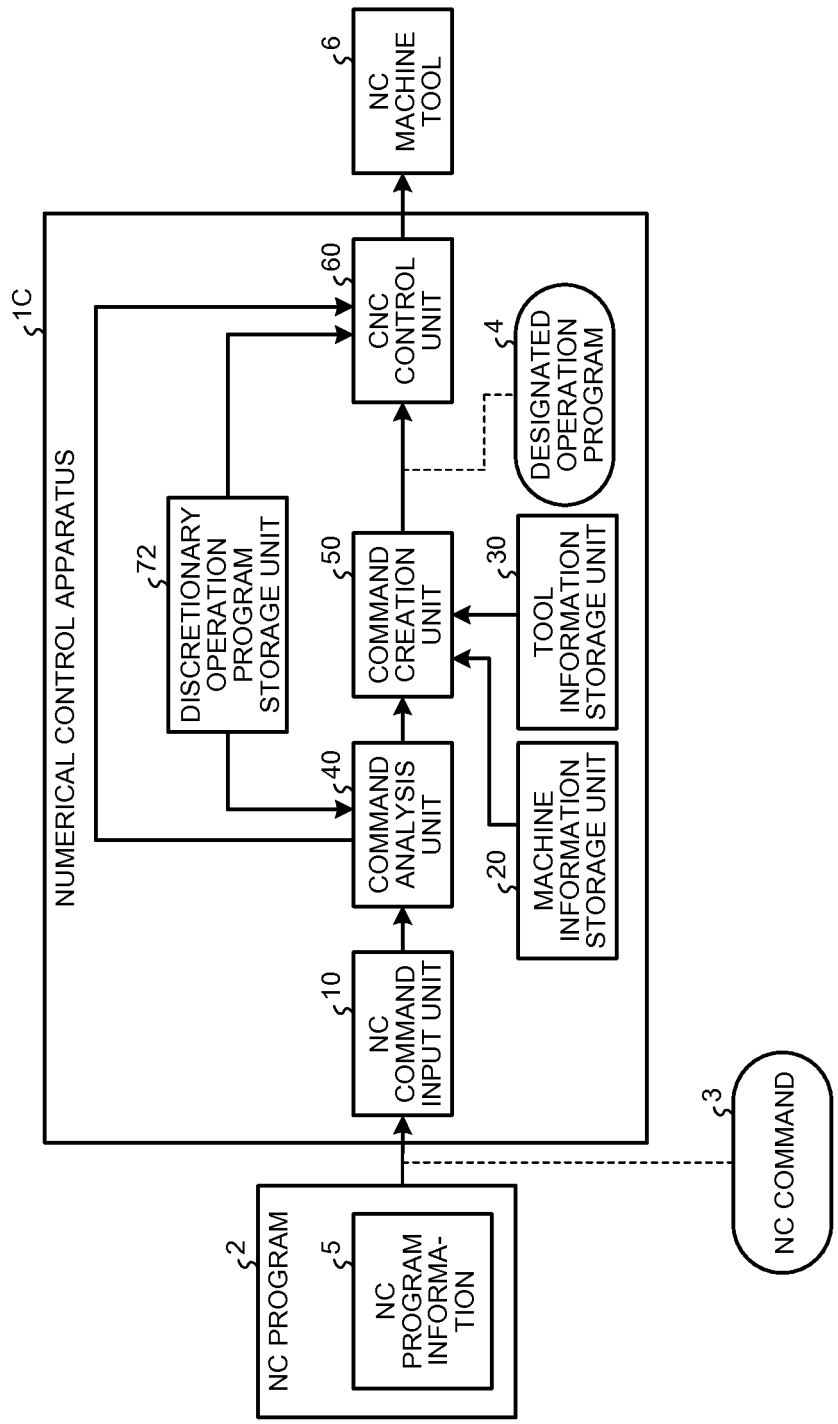
FIG. 12 is a block diagram illustrating the configuration of a numerical control apparatus according to a third embodiment.

FIG. 12 is a block diagram illustrating the configuration of a numerical control apparatus according to the third embodiment. Components in the FIG. 12 that achieve identical functions as those of the numerical control apparatus 1A according to the first embodiment illustrated in FIG. 1 are designated with identical reference signs, and duplicate description will be omitted.

A numerical control apparatus 1C according to the third embodiment includes a discretionary operation program storage unit 72 in addition to the components of the numerical control apparatus 1A. The discretionary operation program storage unit 72 stores a macro program created in advance by a user and may be a memory. The discretionary operation program storage unit 72 stores the correspondence between a designated operation program 4 and a macro program. The discretionary operation program storage unit 72 also stores the correspondence between the interpretation of argument data and a macro program. The discretionary operation program storage unit 72 is connected to a command analysis unit 40 and a CNC control unit 60.

The numerical control apparatus 1C transmits the designated operation program 4 generated by a command creation unit 50 to the CNC control unit 60. The CNC control unit 60 verifies the macro programs in the discretionary operation program storage unit 72 before executing the designated operation program 4.

If a macro program corresponding to the designated operation program 4 is stored in the discretionary operation program storage unit 72, the CNC control unit 60 replaces the designated operation program 4 with the macro program. This enables the NC command 3 (the designated operation program 4) to be executed with a macro program created originally by a user.

Additionally, the command analysis unit 40 verifies the macro programs in the discretionary operation program storage unit 72 after creating argument data for the NC command 3 and before transmitting the argument data to the command creation unit 50. If a macro program corresponding to the interpretation of the argument data is stored in the discretionary operation program storage unit 72, the command analysis unit 40 interprets the argument data by using the macro program.

Note that the numerical control apparatus 1C may perform one of the processing for replacing the designated operation program 4 with a macro program and the processing for interpreting argument data with a macro program.

In this manner, the third embodiment allows the designated operation program 4 to be replaced with a macro program created in advance and thus provides the capability to create the designated operation program 4 desired by a user. The third embodiment also allows argument data to be interpreted with a macro program and thus provides the capability to create the designated operation program 4 desired by a user.

Fourth Embodiment

A fourth embodiment of the present invention will now be described with reference to FIG. 13. In the fourth embodiment, a format for NC commands independent of the NC machine tool 6 is prepared in advance, and the NC command 3 is changed into the prepared NC command format.

A numerical control apparatus 1D (not shown) having a similar configuration to that of the numerical control apparatus 1A is used in the present embodiment. A machine information storage unit 20 of the numerical control apparatus 1D stores correspondence information (correspondence of a command format) that associates the NC command 3 with a predetermined command format.

FIG. 13 is a diagram illustrating the correspondence information indicative of the correspondence of a command format. Correspondence information 93 is information that associates a command in the NC command 3 with a command having a discretionary format for changing the NC command 3.

In the correspondence information 93, a command before change indicates the NC command 3 and the name of a command after change indicates the command name of a command after change to which the NC command 3 may be changed. The name of a command after change is set in advance in a discretionary command format in the correspondence information 93. Here, the discretionary command format is a discretionary character string illustrated under the name of command after change in FIG. 13 and may be, for example, a generally used G-code command or an M-code command. A command after change is an NC command independent of an NC machine tool.

Effective command in the correspondence information 93 indicates which one of the command before change and the name of the command after change to use, and it is set according to an instruction from a user. When Effective command indicates the command before change, the NC command 3 is used without making a change. When Effective command indicates the name of the command after change, the NC command 3 is changed to the name of the command after change.

When Effective command indicates the name of command after change, a command creation unit 50 changes the NC command 3 to be on the command format of the name of a command after change on the basis of the correspondence information 93. This enables the NC command 3 to be changed into a discretionary command format.

In this manner, the fourth embodiment allows the NC command 3 to be changed into any command format set in advance and thus enables the NC machine tool 6 to execute the NC command 3 in any command format desired by a user.

INDUSTRIAL APPLICABILITY

As described above, the numerical control apparatus according to the present invention is suitable for controlling processing that is independent of the machining of an NC machine tool.

REFERENCE SIGNS LIST

1A to 1C numerical control apparatus, 2 NC program, 3 NC command, 4 designated operation program, 5 NC program information, 6 NC machine tool, 10 NC command input unit, 20 machine information storage unit, 30 tool information storage unit, 40 command analysis unit, 50 command creation unit, 60 CNC control unit, 71 instruction input unit, 72 discretionary operation program storage unit, 91 machine information, 92 tool information, correspondence information.

The invention claimed is:

1. A numerical control apparatus, comprising:
   a numerical control (NC) command inputter that receives a first NC command and a second NC command,
      the first NC command, as an NC command included in an NC program, being independent of a model of an NC machine tool and serving as an NC command that enables processing independent of NC machining to be performed, the processing independent of the NC machining being processing of an operation other than physical machining of a workpiece, and
      the second NC command enabling the physical operation of the NC machining of the workpiece to be performed;
   a machine information storage that stores therein model information related to the model of the NC machine tool;
   a tool information storage that stores tool information on a tool to be used on the NC machine tool;
   a command analyzer that determines whether an NC command input to the NC command input unit is the first NC command based on a determination whether the NC command input into the NC command inputter is identical to a predetermined NC command;
   a command creator that, when the NC command is the first NC command, creates a designated operation program based on the first NC command, the model information, and the tool information,
      the designated operation program enabling the NC machine tool to perform a series of operations corresponding to the first NC command; and
   a controller
      that controls the NC machine tool so as to execute the processing independent of the physical operation of the NC machining of the workpiece by executing the designated operation program, and
      that causes the NC machine tool to execute the physical operation of the NC machining of the workpiece by using the second NC command,
   wherein the NC command inputter, the command analyzer, the command creator, and the controller are implemented in a processor.

2. The numerical control apparatus according to claim 1, wherein
   the processing independent of the physical operation of the NC machining of the workpiece is tool replacing, coordinate system setting up, traveling to a machining start point position, or traveling to a machining end point position.

3. The numerical control apparatus according to claim 1, wherein
   the machine information storage stores therein, as the model information, at least one of an axis configuration of the NC machine tool, a presence of a peripheral device of the NC machine tool, and a type of the peripheral device.

4. The numerical control apparatus according to claim 3, wherein
   the axis configuration includes an axis name or an axis type, and
   the peripheral device includes a tool rest.

5. The numerical control apparatus according to claim 3, wherein
   the tool information storage further stores therein, as the tool information, information on a tool to be used on the peripheral device.

6. The numerical control apparatus according to claim 1, wherein
   the machine information storage further stores in advance correspondence between the first NC command and a command format for conversion, and
   the command analyzer changes the first NC command into the command format for conversion based on the correspondence.

7. The numerical control apparatus according to claim 6, further comprising
   a discretionary operation program storage that stores therein a macro program corresponding to the designated operation program, wherein
   the controller changes the designated operation program created by the command creator to the macro program in accordance with a macro program corresponding to the designated operation program.

8. The numerical control apparatus according to claim 6, further comprising a discretionary operation program storage that stores therein a macro program corresponding to argument data created in accordance with the first NC command, wherein
   the command analyzer creates argument data in accordance with the first NC command and interprets the argument data based on the macro program corresponding to the argument data.

9. The numerical control apparatus according to claim 1, further comprising an instruction inputter that receives an instruction from a user, wherein
   the controller changes the designated operation program according to the instruction from the user and executes the designated operation program that has been changed.

* * * * *